United States Patent [19]

Fatehi et al.

[11] Patent Number: 6,016,219

[45] Date of Patent: *Jan. 18, 2000

[54] OPTICAL PROTECTION SWITCHING SYSTEM

[75] Inventors: Mohammad T. Fatehi, Middletown; Wayne Harvey Knox, Rumson, both of N.J.

[73] Assignee: Lucent Technologies Inc., Murray Hill, N.J.

[*] Notice: This patent is subject to a terminal disclaimer.

[21] Appl. No.: 09/168,267

[22] Filed: Oct. 7, 1998

Related U.S. Application Data

[63] Continuation of application No. 08/777,892, Dec. 31, 1996, Pat. No. 5,889,610.

[51] Int. Cl.[7] .............................. G02B 6/26; H01S 3/00
[52] U.S. Cl. ...................... 359/341; 359/117; 359/134; 359/179
[58] Field of Search .................................. 359/117, 134, 359/160, 179, 341; 385/17

[56] References Cited

U.S. PATENT DOCUMENTS

| | | | |
|---|---|---|---|
| 3,991,278 | 11/1976 | Fang et al. | 370/227 |
| 5,181,134 | 1/1993 | Fatehi et al. | 359/117 |
| 5,365,368 | 11/1994 | Hsu et al. | 359/341 |
| 5,491,581 | 2/1996 | Roba | 359/341 |
| 5,539,657 | 7/1996 | Utsumi et al. | 364/514 A |
| 5,570,218 | 10/1996 | Sotom | 359/117 |
| 5,623,565 | 4/1997 | Blair et al. | 385/24 |
| 5,633,961 | 5/1997 | Kirkby et al. | 385/16 |
| 5,745,274 | 4/1998 | Fatehi et al. | 359/187 |
| 5,889,610 | 3/1999 | Fatehi et al. | 359/341 |

FOREIGN PATENT DOCUMENTS

| | | |
|---|---|---|
| 2094867 | 4/1993 | Canada . |
| 4-9929 | 1/1992 | Japan ............ H04B 9/00 |
| 06283790 | 10/1994 | Japan . |
| 92/05642 | 4/1992 | WIPO . |

*Primary Examiner*—Nelson Moskowitz
*Attorney, Agent, or Firm*—Gregory J. Murgia

[57] ABSTRACT

An optical line protection switching system is realized by employing a plurality of rare earth-doped fiber optical amplifiers as gain-switched optical connections, for example gain-switched optical distributors, i.e., commutators, and/or gain-switched optical selectors in a gain switched optical line protection switching system. In one embodiment, at least one or more gain switched optical distributors are employed to realize so-called head-end switching of an incoming optical signal and one or more gain switched optical selectors are employed to realize so-called tail-end switching of the optical signal to form a 1×1 (1×N) optical line protection switching system. In another embodiment, an incoming optical signal is bridged to one or more optical paths, while the tail-end switching is realized by employing one or more gain-switched optical selectors to form a 1+1 (1+N) optical line protection switching system.

21 Claims, 8 Drawing Sheets

OPTICAL PROTECTION SWITCHING SYSTEM

This is a continuation of application Ser. No. 08/777,892, filed on Dec. 31, 1996 now U.S. Pat. No. 5,889,610.

RELATED APPLICATIONS

U.S. patent application Ser. No. 08/777,894 now U.S. Pat. No. 5,815,613, Ser. No. 08/777,891 (now U.S. Pat. No. 5,930,013) and Ser. No. 08/777,890 (Allowed) Apr. 8, 1999 were filed concurrently herewith.

1. Technical Field

This invention relates to protection switching systems and, more specifically, to optical line protection switching systems.

2. Background

Prior optical line protection switching systems are known that employed electro-mechanical optical switching elements as distributors and selectors.

An electrical 1×N distributor switch is an 1×N switching device which routes the signal or signals from a single input port to any one of the N output ports. An optical 1×N distributor switch is the optical analog of an electrical 1×N distributor switch where the input and output ports are optical fibers carrying one or more optical communication signals at a given wavelength or a plurality of wavelengths. Certain distributor switches may permit routing the signal from the input line to two or more of the N output ports, thus dividing the signal energy from the input line among the target output ports. This properly is called the broadcasting or bridging capability of the distributor switch.

An optical N×1 selector switch is the optical analog of an electrical N×1 selector switch where the input and output ports are optical fibers carrying one or more optical communication signals at different wavelengths. Certain selector switches may permit selection of more than one input port and adding (under certain rules) the signals from the selected ports. This properly is called the collection capability of the selector switch.

A number of electro-mechanical optical distributor and selector switches are presently available. These devices are based on mechanically moving the input and/or output fibers or utilizing various reflective or deflective optical elements to spatially direct a beam of light from the exit pupil of the input fiber and routing it to the entrance pupils of the output fibers. Clearly, these mechanical switches are slow and, in most cases, do not permit broadcast capability, a desirable feature in communication systems. In some cases, the optical loss associated with these elements is significant.

Such prior cross-connect arrangements employing electro-mechanical optical distributors and selectors were limited in selecting only one line at a time, their speed was slow, and their reliability was less than desirable.

SUMMARY OF THE INVENTION

The problems and limitations of the prior known optical line protection switching systems employing electro-mechanical optical devices are overcome, in one embodiment of the invention, by employing a plurality of rare earth-doped fiber optical amplifiers as gain-switched optical connections, for example gain-switched optical distributors, i.e., commutators, and/or gain-switched optical selectors in a gain switched optical line protection switching system. In one embodiment, at least one or more gain switched optical distributors are employed to realize so-called head-end switching of an incoming optical signal and one or more gain switched optical selectors are employed to realize so-called tail-end switching of the optical signal to form a 1×1 (1×N) optical line protection switching system. In another embodiment, an incoming optical signal is bridged to one or more optical paths, while the tail-end switching is realized by employing one or more gain-switched optical selectors to form a 1+1 (1+N) optical line protection switching system.

Each of the rare earth-doped fiber optical amplifiers acts as an ON/OFF switch. Also, both the gain-switched optical distributors and/or gain-switched optical selectors employed in the loss-less optical cross-connect arrangement of this invention are a natural fit into today's optically amplified optical communication systems. In one arrangement, this is realized by employing a pump select circuit in conjunction with a plurality of pumps and the plurality of corresponding rare earth-doped fiber optical amplifiers. The particular pump and corresponding optical amplifier are selected by use of a control circuit arrangement to determine which output port or ports is (are) connected to the input port. In another arrangement, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical amplifiers to be activated, thus routing the input signals at any of a plurality of given wavelengths to the corresponding output line (or lines if broadcasting capability is employed.

DETAILED DESCRIPTION

Figure 1:
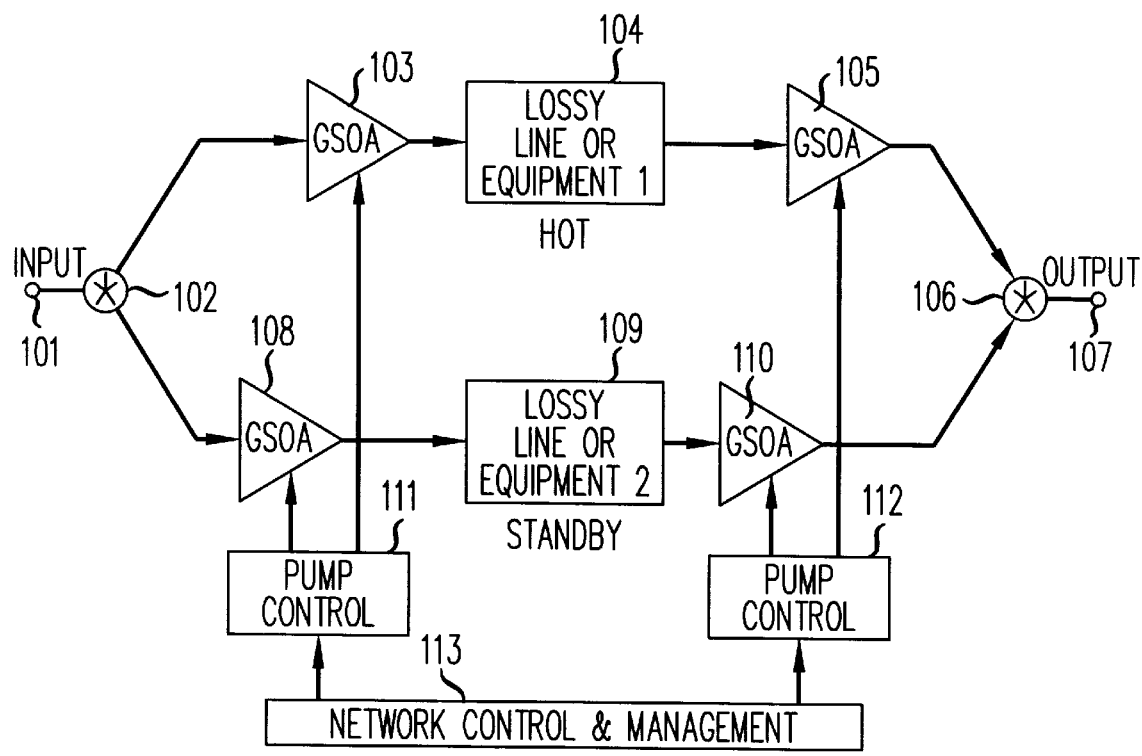
FIG. 1 illustrates one embodiment of a 1×1 (1×N) optical line protection switching system utilizing gain-switched optical distributors for the head-end switching and gain-switched optical selectors for the tail-end switching.

FIG. 1 illustrates one embodiment of a 1×1 (1×N) optical line protection switching system utilizing gain-switched optical distributors for the head-end switching and gain-switched optical selectors for the tail-end switching. Specifically, shown at the head-end is input 101 for receiving an incoming optical signal, which is supplied to optical star coupler 102 (of a type known in the art). Coupler 102 is adapted to supply a supplied optical signal to gain-switched optical amplifiers (GSOAs) 103 and 108. Optical amplifiers employed in GSOAs 103 and 108 may be of a type shown in either FIG. 3A or FIG. 3B, described below. Here it is assumed that the pump(s) for GSOAs 103 and 108 is (are) included in pump control 111. Pump control 111 is responsive to control signals from network control and management unit 113. Elements 101, 102, 103, 108 111 and 113 form a gain-switched optical distributor and may be of a type shown in either of FIGS. 4, 5 or 6 and described below. The optical signal from coupler 102 is supplied via GSOA 103 or GSOA 108 to either lossy optical fiber or optical equipment 104 or lossy optical fiber or optical equipment 109 depending on which one of GSOAs 103 and 108 is turned ON under control of pump control 111. At the tail-end, optical signals from lossy optical fiber or optical equipment 104 and lossy optical fiber or optical equipment 109 are supplied to GSOA 105 and GSOA 110, respectively. Outputs from GSOAs 105 and 110 are supplied to optical star coupler 106 and, thereafter, to output optical fiber 107. Optical amplifiers employed in GSOAs 105 and 110 may also be of a type shown in either FIG. 3A or FIG. 3B, described below. Again, it is assumed that the pump(s) for GSOAs 105 and 110 is (are) included in pump control 112. Pump control 112 is responsive to control signals from network control and management unit 113 to turn the appropriate one of GSOAs 105 and 110 ON. Elements 105, 110, 106, 107 112 and 113 form a gain-switched optical selector and may be of a type shown in either of FIGS. 7, 8 or 9 and described below. It will be apparent that to form an active optical communication path both the GSOAs in that path must be ON and the GSOAs in the standby path must be OFF. Thus, if the active path is comprised or elements 101, 102 103 104 105 and 106, both GSOA 103 and GSOA 105 must be turned ON by pump control 111 and pump control 112, respectively, and GSOA 108 and GSOA 110 must be turned OFF by pump control 111 and pump control 112, respectively. The standby path includes elements 101, 102, 108, 109, 110, 106 and 107. Note that for brevity and clarity of exposition only a 1×1 optical line protection system has been described, which uniquely employs a gain-switched optical distributor at the head-end and a gain-switched optical selector at the tail-end. However, it will be apparent to those skilled in the art how to readily expand to a 1×N embodiment.

Figure 2:
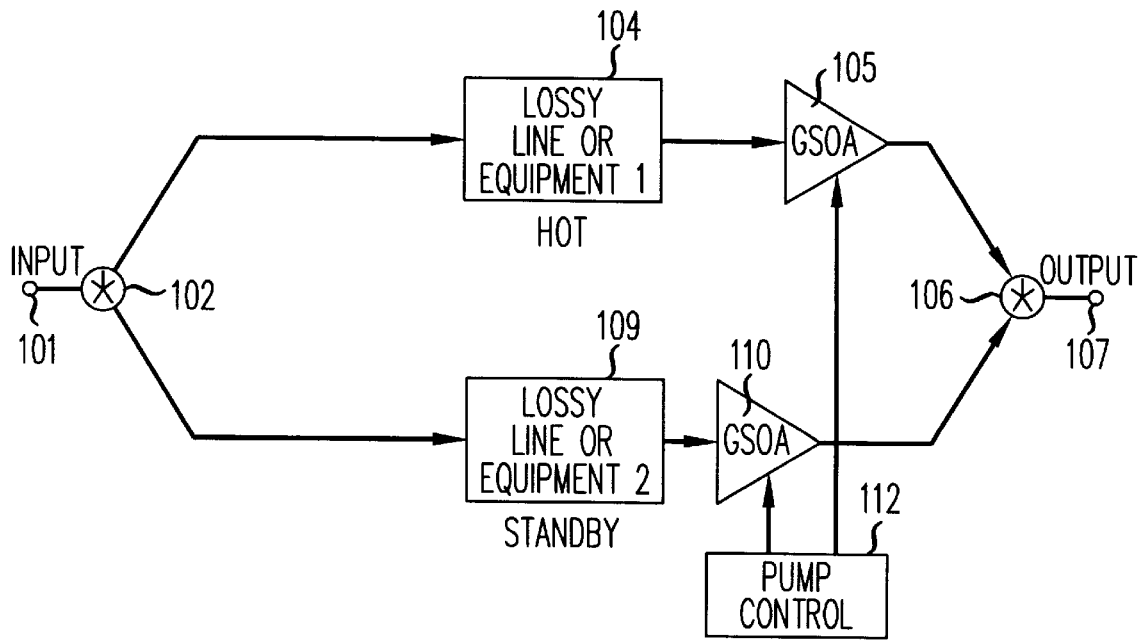
FIG. 2 illustrates an embodiment of a 1+1 (1+N) optical line protection switching system utilizing head-end bridging and gain-switched optical selectors for the tail-end switching.

FIG. 2 illustrates an embodiment of a 1+1 (1+N) optical line protection switching system utilizing head-end bridging and gain-switched optical selectors for the tail-end switching. The 1+1 optical line protection switching system shown in FIG. 2 utilizes most of the elements employed in the embodiment of FIG. 1 in the same manner as they are in FIG. 1. Therefore, those elements have been similarly numbered as those if FIG. 1 and will not be explained again in detail. In the embodiment shown, bridging is employed at the head-end, while switching is employed at the tail-end. The tail-end switching is identical to that employed in FIG. 1. Since, bridging is used at the head-end there is no need for GSOA 103 (FIG. 1), GSOA 108, pump control 111 and network control and management unit 113. Note that the pump control function can be performed locally at the tail-end via pump control 112. Thus in this example, an active optical communication path may include elements 101, 102 104, 105, 106 and 107. This is realized by, GSOA 105 being turned ON via pump control 112 and GSOA 110 being turned OFF via pump control 112. Then a standby path is formed by elements 101, 102, 109, 110, 106 and 107. Note that for brevity and clarity of exposition only a 1+1 optical line protection system has been described, which uniquely employs optical bridging at the head-end and a gain-switched optical selector at the tail-end. However, it will be apparent to those skilled in the art how to readily expand to a 1+N embodiment.

Figure 3A:
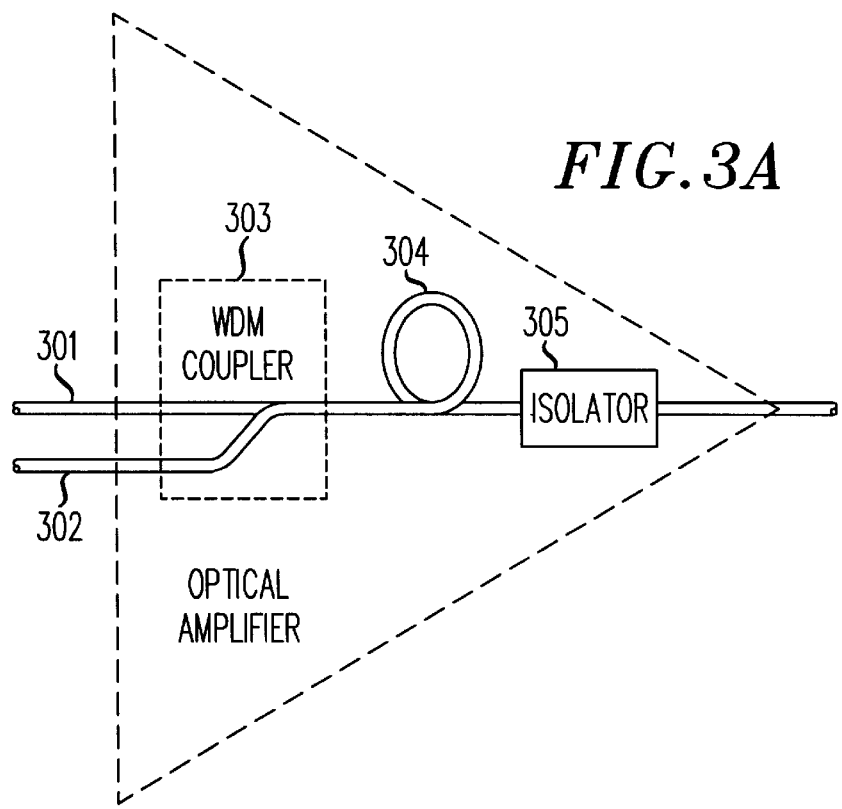
FIGS. 3A and 3B show, in simplified form, two gain-switched optical amplifier arrangements, each of which may be employed in the embodiments of the invention.
Figure 3B:
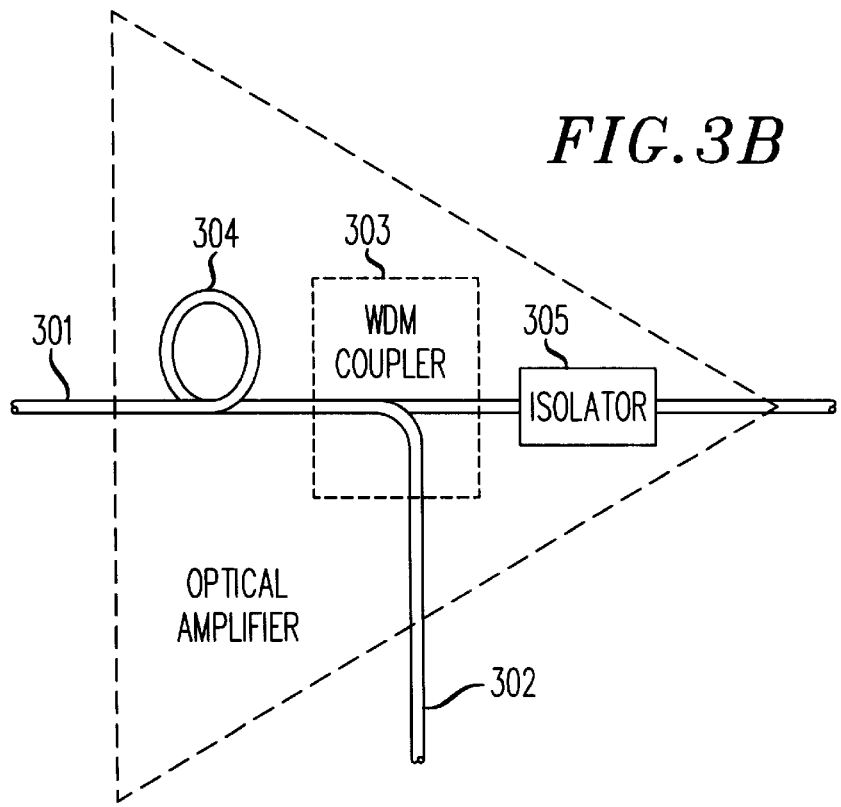

FIGS. 3A and 3B show, in simplified form, two gain-switched optical amplifiers which may be employed in the embodiments of the invention. Specifically, FIG. 3A shows a gain-switched optical amplifier employing co-directional pumping. Thus, shown are input terminal 301 which supplies an input optical signal to the optical amplifier through, in this example, wavelength division multiplexed (WDM) coupler 303 and input 302 through which a pump signal is supplied to the optical amplifier also through, in this example, wavelength division multiplexed (WDM) coupler 303. Also shown are a rare earth-doped fiber optical amplifier 304, which may be a desired length of, for example, erbium doped optical fiber, however, other rare-earth doping elements may also be advantageously employed. An optional optical isolator 305 is also shown. The elements employed in the optical amplifier shown in FIG. 3B are the same as those employed in FIG. 3A, the difference being that counter directional pumping is employed. Consequently, WDM coupler 303 is placed in the out put of rare earth-doped fiber optical amplifier 304 before the optional optical isolator 305. Additionally, it should be noted that the pumping could also be bi-directional. Further note that loss is equalized by the length of the rare earth-doped fiber and gain is equalized by the pump power.

Figure 4:
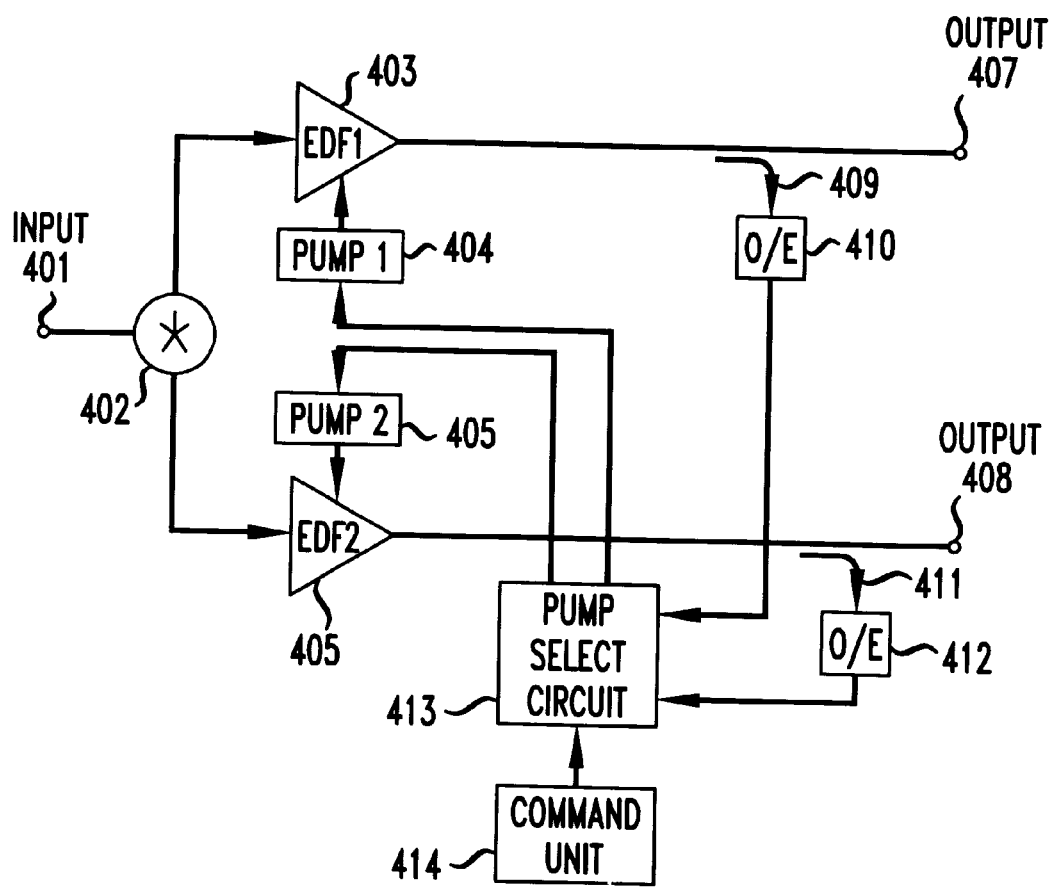
FIG. 4 illustrates an optical distributor that employs so-called switched pumps with rare earth-doped fiber optical amplifiers.

FIG. 4 shows, in simplified form, a gain-switched optical distributor including optical fiber line 401 which supplies optical signals at predetermined wavelengths or sets of wavelengths to rare earth-doped fiber optical amplifier (herein after "amplifier") 403 and amplifier 405, respectively, via the optical star coupler (herein after "coupler") 402. The rare earth-doped fiber can be, for example, a length of erbium-doped fiber coupled to a wavelength selective coupler through which a pump is coupled thereto. Two such rare earth-doped fiber optical amplifiers are shown in FIGS. 3A and 3B and described above. As shown, pump 404 is coupled to amplifier 403, and pump 406 is coupled to amplifier 405. As is known in the art, each of pumps 404 and 406, respectively, powers amplifiers 403 and 405. The inputs of the amplifiers 403 and 405 are identical copies of the input signal on line 401 provided by coupler 402, which in this example is a 2×N coupler, in well-known fashion. The outputs of the amplifiers 403 and 405 are connected to the output ports 407 and 408 via the optional optical monitoring taps (herein after "taps") 409 and 411. Taps 409 and 411 tap off a small fraction (for example 1–10%) of the output optical signals and route the optical signals to the photo-detectors (optical to electrical converters, O/E) 410 and 412, respectively. O/Es 410 and 412 help in the processes of determining which of amplifiers 403 and 405 are currently selected by the power level of the selected line and determining the parameters and identification (D) tags associated with selected lines (see for example, co-pending U.S. patent application Ser. No. 08/579,529, filed Dec. 27, 1995) now U.S. Pat. No. 5,745,274, issued Apr. 28, 1998. The information from O/Es 410 and 412 are supplied to pump selector circuit 43 which then selects either pump 404 or pump 406, in accordance with desired parameters, and commands from the command and control unit 414. It should be noted, however, that this monitoring arrangement is optional and other optical monitoring and control arrangements known in the art may be equally employed. This will be apparent to those skilled in the art. Also supplied to pump select circuit 413 are command and control information from command and control unit 414 which is utilized with information from other network elements in an optical system in order to select which of pumps 404 or 406 is to be selected and, accordingly, which of amplifiers 403 or 405 will be switched ON and which will be switched OFF. It should be noted, however, that although we have shown the employment of 0/Es 410 and 412, in this example, that other arrangements may be employed to monitor different parameters in order to select which of pumps 404 and 406 and, accordingly, which of amplifiers 403 and 405 will be switched ON.

Figure 5:
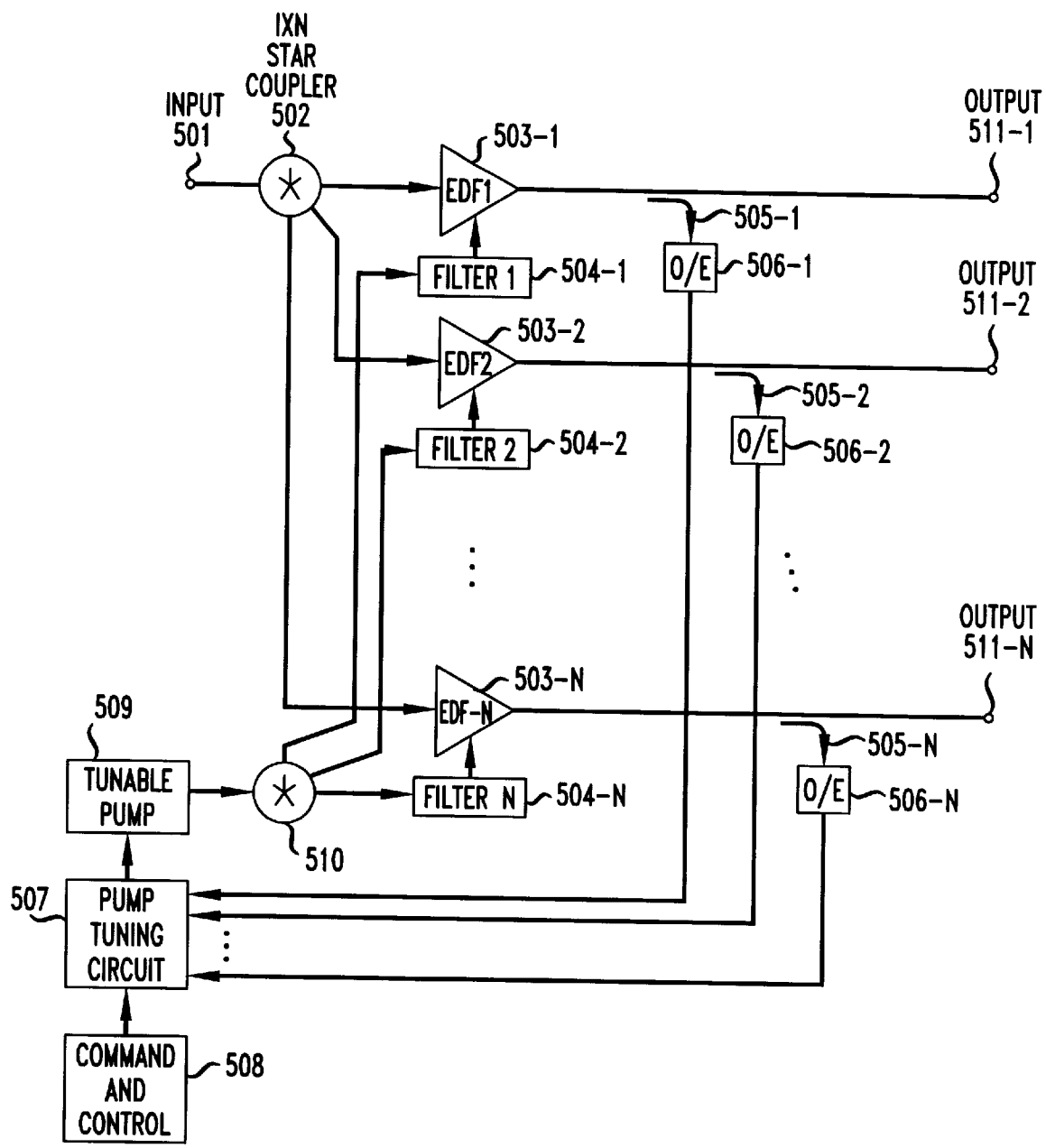
FIG. 5 shows an optical distributor that utilizes a tuned-pump arrangement including rare earth-doped fiber optical amplifiers.

FIG. 5 shows, in simplified form, another gain-switched optical distributor for distributing an optical signal from an input optical fiber line 501 to a plurality of output optical fiber lines 511-1 through 511-N and a corresponding plurality of amplifiers 503-1 through 503-N. Note that only one tunable pump 509 is required which gives us the technical advantage of cost savings. Associated with tunable pump 509 are another optical star coupler (herein after "coupler") 510 and a plurality of fixed (or presetable) optical band pass filters (herein after "filters") 504-1 through 504-N which are associated on a one-to-one basis with amplifiers 503-1 through 503-N, respectively. In practice, these filters, 504-1 through 504-N, may be built into the wavelength selective coupler(s) that are used to build the amplifiers 503-1 through 503-N ( see the literature for structural details of various optical amplifier designs). Again, the outputs of amplifiers 503-1 through 503-N are supplied to the optional taps 505-1 through 505-N for the purpose of being monitored for integrity by the monitors 506-1 through 506-N, prior to being routed to the system output ports 511-1 through 511-N. Again, the outputs of the O/E devices 506-1 through 506-N are combined in the pump tuning circuit 507 with information from the command and control unit 508 to tune the wavelength of the tunable pump 509.

Figure 6:
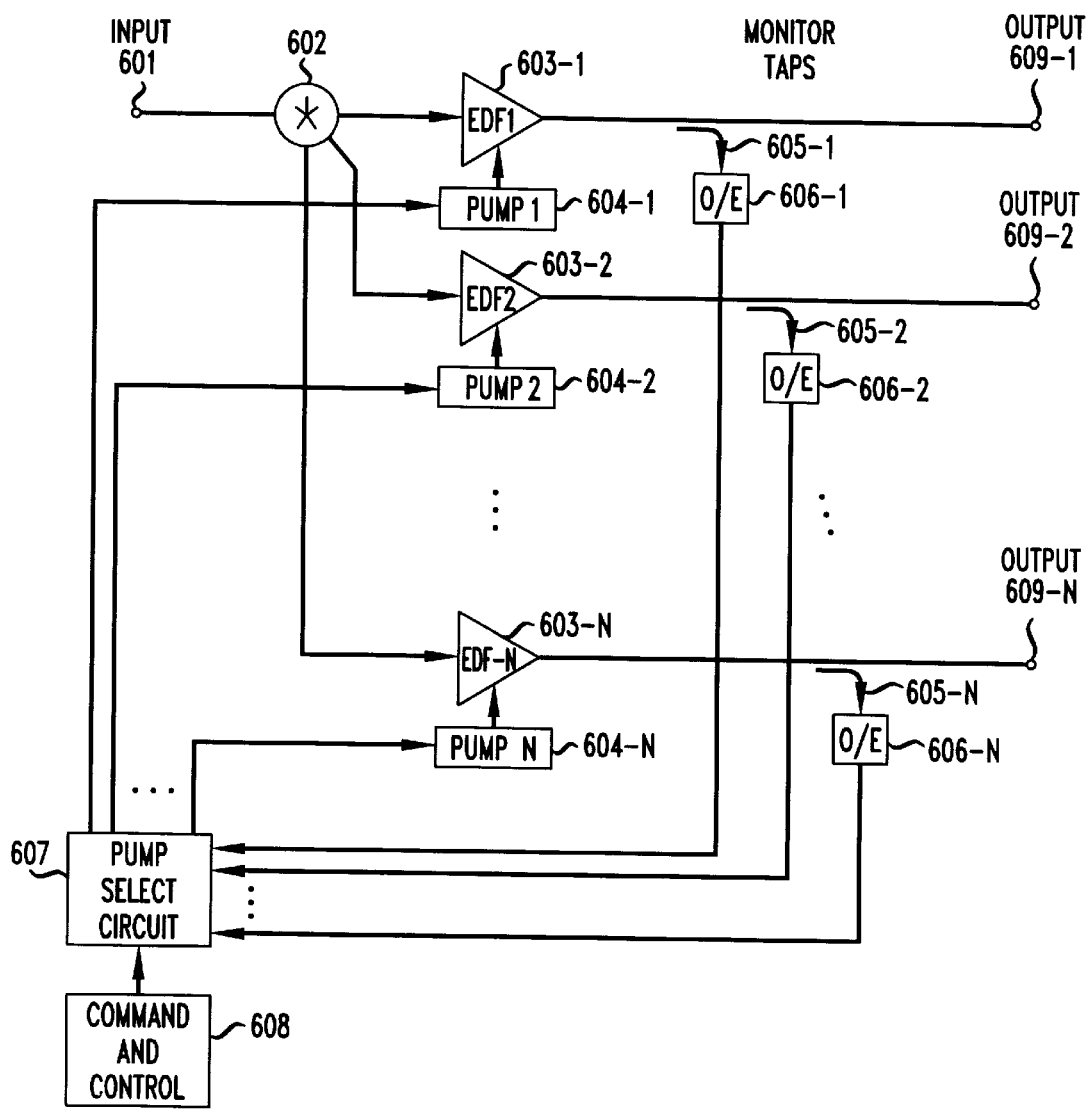
FIG. 6 shows an optical distributor arrangement including a plurality of switched pumps and corresponding rare earth-doped fiber optical amplifiers.

FIG. 6 shows, in simplified block diagram form, another gain-switched optical distributor employing a single input line 601 and a plurality of output optical fiber lines 609-1 through 609-N and a corresponding plurality of amplifiers 603-1 through 603-N. Note that a corresponding plurality of pumps 604-1 through 604-N are associated with amplifiers 603-1 through 603-N, respectively. Again, the outputs of amplifiers 603-1 through 603-N are supplied to the taps 605-1 through 605-N for the purposed of being monitored for integrity by the 0/Es 606-1 through 606-N, prior to being routed to the system output ports 609-1 through 609-N. Again, the outputs of the O/E devices 606-1 through 606-N are combined in the pump select circuit 607 with information from the command and control unit 608 to activate one (or more, if broadcast is desired) of the pumps 604-1 though 604-N and, consequently, then the turning the corresponding amplifier(S) 603-1 though 603-N ON or OFF. It should be noted, however, that other optical coupling and monitoring arrangements known in the art may be equally employed in place of optical couplers 605-1 through 605-N and the associated components. This will be apparent to those skilled in the art Specifically, in this example, O/Es 606-1 through 606-N each monitor the power level of an output signal on an associated one of output fibers 605-1 through 605-N, and determines the parameters and ID tags associated with that signal for verification of the operation and quality of the distributor switch.

Figure 7:
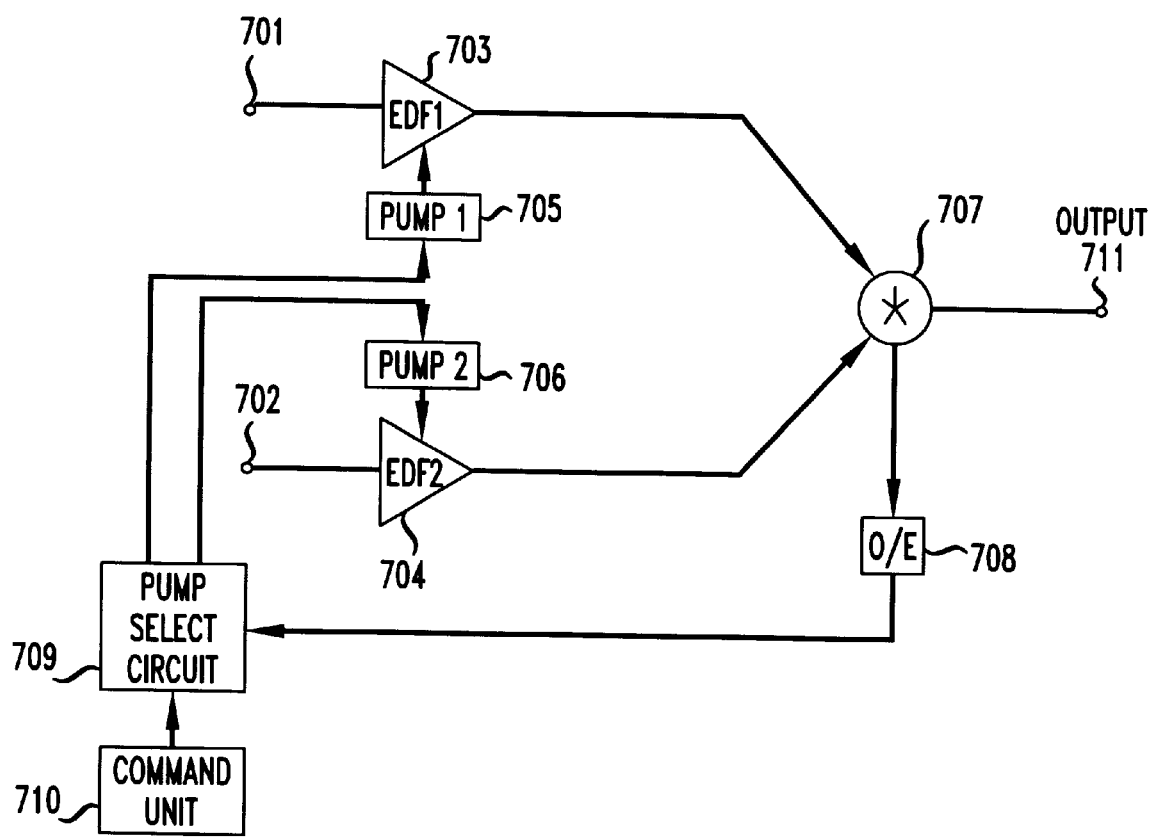
FIG. 7 illustrates an optical selector employing so-called switched pumps with rare earth-doped fiber optical amplifiers.

FIG. 7 shows, in simplified form, a gain-switched optical selector including optical fiber lines 701 and 702 which supply optical signals at predetermined wavelengths or sets of wavelengths to rare earth-doped optical fiber amplifier (herein after "amplifier") 703 and amplifier 704, respectively. The rare earth doped optical fiber can be, for example, a length of erbium doped fiber coupled to a wavelength selective coupler through which a pump is coupled thereto. As shown, pump 705 is coupled to amplifier 703, and pump 706 is coupled to amplifier 704. As is known in the art, each of pumps 705 and 706 respectively powers amplifiers 703 and 704. The outputs of the amplifiers 703 and 704 are combined by an optical star-coupler (herein after "coupler") 707, in well-known fashion. The coupler 707, for a two-optical line arrangement, is known as a 3dB coupler. The primary output of the coupler 707 is supplied as an output to output optical fiber 711, which may be connected to a receiver or to a long distant transport fiber. The secondary output of coupler 707 is supplied to an optical to electrical converter (O/E) 708, which monitors the power level of the selected line and determines the parameters and ID (identification) tags associated with selected lines (see for example, co-pending U.S. patent application Ser. No. 08/579,529, filed Dec. 27, 1995) now U.S. Pat. No. 5,745, 274, issued Apr. 28,1998. The information from O/E 708 is supplied to pump selector 709, which then selects either pump 705 or pump 706, in accordance with desired parameters. It should be noted, however, that other optical coupling arrangements known in the art may be equally employed in place of coupler 707. This will be apparent to those skilled in the art. It should be noted that the secondary output from coupler 707 which is supplied to O/E 708 is optional. The output from O/E 708 is supplied to pump select circuit 709, where it is employed to further refine the pump selection process. Specifically, in this example, O/E 708 monitors the power level of the selected signal and determines the parameters and ID tags associated with the selected line(s) being supplied to coupler 707. Also supplied to pump select circuit 709 are command and control information from command and control unit 710, which is utilized with information from other network elements in an optical system in order to select which of pumps 705 or 706 is to be selected and, accordingly, which of amplifiers 703 or 704 will be supplying an optical signal via coupler 707 to output optical fiber 711 as an output. It should be noted, however, that although we have shown the use of O/E 708, in this example, that other arrangements may be employed to monitor different parameters in order to select which of pumps 705 and 706 and, accordingly, which of amplifiers 703 and 704 will be supplying the output.

Figure 8:
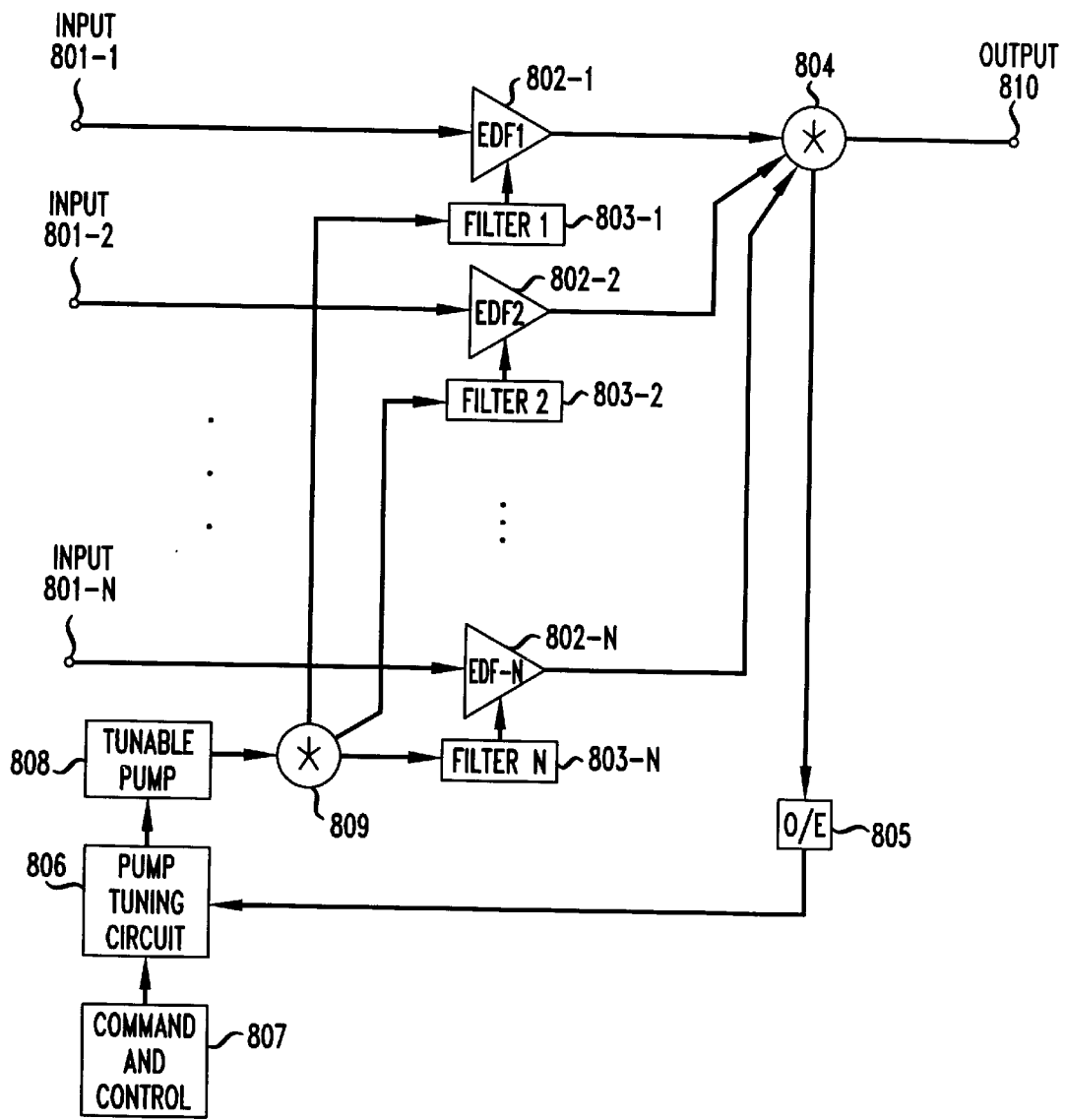
FIG. 8 shows an optical selector employing a tuned-pump arrangement including rare earth-doped fiber optical amplifiers.

FIG. 8 shows in simplified form another gain-switched optical selector for selecting an optical signal from a plurality of optical fiber lines 801-1 through 801-N and a corresponding plurality of rare amplifiers 802-1 through 802-N. In gain-switched optical selector only one tunable pump 808 is employed, which is coupled to each of filters 803-1 through 803-N though optical star coupler (herein after "coupler") 809, which gives us the technical advantage of cost savings. The plurality of filters 803-1 through 803-N are associated on a one-to-one basis with amplifiers 802-1 through 802-N, respectively. Again, the outputs of amplifiers 802-1 through 802-N are supplied to optical star coupler (herein after "coupler") 804. The primary output of coupler 804 provides the system output and is supplied to output optical fiber 810, which may be connected to a receiver or to a long distant transport fiber. The secondary output of coupler 804 is supplied to a power monitor unit 805, which monitors the power level of the selected line and determines the parameters and ID (identification) tags associated with selected lines (see for example, co-pending U.S. patent application Ser. No. 08/579,529, noted above). The information from O/E 805 is supplied to pump tuning circuit 806, which then selects one of pumps 803-1 through 803-N, in accordance with desired parameters. It should be noted, however, that other optical coupling arrangements known in the art may be equally employed in place of coupler 804. It should be noted, however, that although we have shown the use of O/E 805, in this example, that other arrangements may be employed to monitor different parameters in order to adjust pump tuning circuit 806 and, hence, tunable pump 808 and, accordingly, which of amplifiers 802-1 through 802-N will be supplying the output. This will be apparent to those skilled in the art. It should be noted that this secondary output from coupler 804 which is supplied to O/E 805 is optional. The output from O/E 805 is supplied to pump tuning circuit 806, where it is employed to further refine the pump selection process. Specifically, in this example, O/E 805 monitors the power level of the selected signal and determines the parameters and ID tags associated with the selected line(s) being supplied to coupler 804. Also supplied to pump tuning circuit 806 are command and control information from command and control unit 807, which is utilized with information from other network elements in an optical system in order to select which wavelength is to be selected and, accordingly, which of amplifiers 802-1 through 802-N will be supplying an optical signal via coupler 804 to output optical fiber 810 as an output. The output from tunable pump 808 is supplied via coupler 809 to filters 803-1 through 803-N which, in turn, select the appropriate one of amplifiers 802-1 through 802-N to supply an output to coupler 804.

Figure 9:
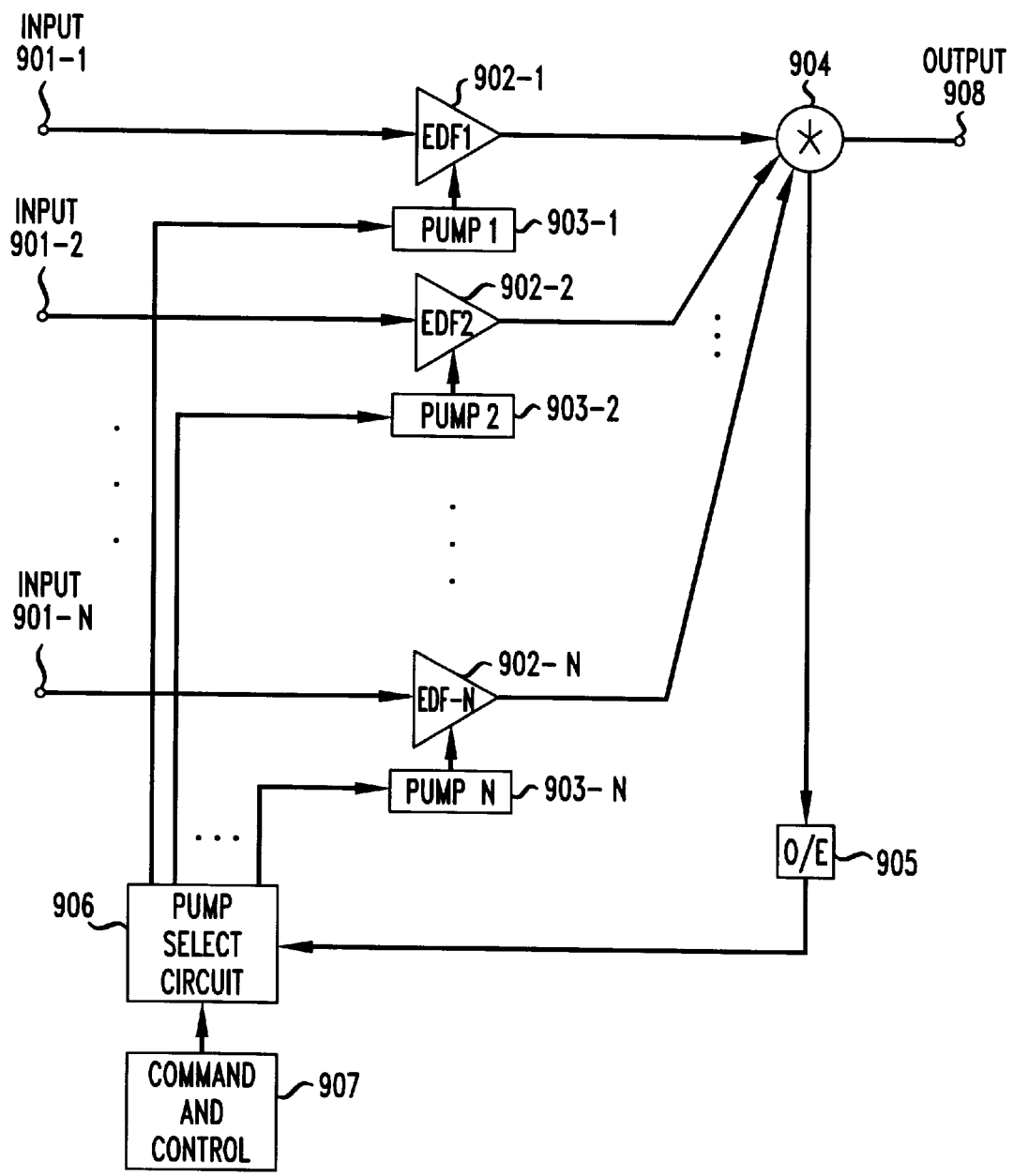
FIG. 9 shows an optical selector that utilizes a switched-pump arrangement including a plurality of pumps and corresponding rare earth-doped fiber optical amplifiers.

FIG. 9 shows in simplified block diagram form, another gain-switched optical selector that employs a plurality of optical fiber lines 901-1 through 901-N and a corresponding plurality of rare earth doped optical fiber amplifiers (herein after "amplifiers") 902-1 through 902-N. In this gain-switched optical selector, a corresponding plurality of pumps 903-1 through 903-N are associated with amplifiers 902-1 through 902-N, respectively. The optical outputs from amplifiers 902-1 through 902-N, in this example, are supplied to an optical star-coupler (herein after "coupler") 904. It should be noted, however, that other optical coupling arrangements known in the art may be equally employed in place of coupler 904. This will be apparent to those skilled in the art. A primary output of star-coupler 904 is supplied to an output of optical fiber 908, while a secondary output from coupler 904, in this example, is supplied to optical to electrical converter (O/E) 905. It should be noted that this secondary output from coupler 904 is optional. The output from O/E 905 is supplied to pump select circuit 906 where it is employed to further refine the pump selection process. Specifically, in this example, O/E 905 monitors the power level of the selected signal and determines the parameters and ID tags associated with the selected line(s) being supplied to coupler 904. Also supplied to pump select circuit 906 are command and control information from command and control unit 907 is utilized with information from other network elements in an optical system in order to select which of pumps 903 are to be selected and, accordingly, which of amplifiers 902 will be supplying an optical signal via coupler 904 to output optical fiber 908 as an output.

What is claimed is:

1. An optical protection switching system having an input and an output comprising:

an input optical coupler for coupling an incoming optical signal to a plurality of optical communication arrangements, such that the input optical coupler performs a head-end bridging function for 1+N protection switching;

a plurality of gain-switched fiber optical amplifiers associated on a one-to-one basis with said plurality of said optical communication arrangements;

a pump arrangement for optically controlling ON/OFF states of each of the plurality gain-switched fiber optical amplifiers for controlling the routing of the incoming optical signal from the input to the output;

outputs from said gain-switched fiber optical amplifiers being supplied to the optical output through an output optical coupler, the plurality of gain-switched fiber optical amplifiers, the output optical coupler, and the pump arrangement together forming a gain-switched optical selector for performing a tail-end switching function for 1+N protection switching.

2. The optical protection switching system of claim 1 wherein each of the fiber optical amplifiers comprises an optical rare earth-doped fiber having a predetermined length and a corresponding pump responsive to the command signal for turning the fiber optical amplifier ON/OFF.

3. The optical protection switching system of claim 2 wherein the fiber is doped with erbium.

4. The optical protection switching system of claim 2 wherein the pump arrangement associated with the rare earth-doped fiber is arranged to provide co-directional pumping of the rare earth-doped fiber optical amplifier.

5. The optical protection switching system of claim 2 wherein the pump arrangement associated with the rare earth-doped fiber is arranged to provide counter directional pumping of the rare earth-doped fiber optical amplifier.

6. The optical protection switching system of claim 1 wherein the optical communications arrangement comprises a lossy optical line.

7. The optical protection switching system of claim 1 wherein the optical communications arrangement comprises optical communications equipment.

8. An optical protection switching system having a system input and a system output comprising:

an input optical coupler for coupling an incoming optical signal to a plurality of optical communication arrangements;

a first plurality of gain-switched fiber optical amplifiers each having an input and an output wherein the inputs are associated on a one-to-one basis with a plurality of outputs from the input optical coupler and the outputs are associated on a one-to-one basis with inputs to the plurality of optical communications arrangements;

a second plurality of gain-switched fiber optical amplifiers associated on a one-to-one basis with outputs from the plurality of optical communication arrangements;

a pump arrangement for optically controlling ON/OFF states of each of the plurality of gain-switched fiber optical amplifiers for controlling the routing of the incoming optical signal from the system input to the system output;

outputs from the second plurality of gain-switched fiber optical amplifiers being supplied to the system output through an output optical coupler;

the first plurality of gain-switched fiber optical amplifiers, the input optical coupler, and the pump arrangement together forming a gain-switched optical distributor for performing a head-end switching function for 1×N protection switching; and the second plurality of gain-switched fiber optical amplifiers, the output optical coupler, and the pump arrangement together forming a gain-switched optical selector for performing a tail-end switching function for 1×N protection switching.

9. The optical protection switching system of claim 8 wherein each of the fiber optical amplifiers comprises an optical rare earth-doped fiber having a predetermined length and a corresponding pump responsive to the command signal for turning the optical amplifier ON/OFF.

10. The optical protection switching system of claim 9 wherein the fiber is doped with erbium.

11. The optical protection switching system of claim 9 wherein the pump arrangement associated with the rare earth-doped fiber is arranged to provide co-directional pumping of the rare earth-doped fiber optical amplifier.

12. The optical protection switching system of claim 9 wherein the pump arrangement associated with the rare earth-doped fiber is arranged to provide counter directional pumping of the rare earth-doped fiber optical amplifier.

13. An optical protection switching system having a system input and a system output comprising:

an input optical coupler for coupling an incoming optical signal to a plurality of optical communication arrangements;

a first plurality of gain-switched fiber optical amplifiers each having an input and an output wherein the inputs are associated on a one-to-one basis with a plurality of outputs from the input optical coupler and the outputs are associated on a one-to-one basis with inputs to the plurality of optical communications arrangements;

a second plurality of gain-switched fiber optical amplifiers associated on a one-to-one basis with outputs from the plurality of optical communication arrangements;

a pump arrangement for optically controlling ON/OFF states of each of the plurality of gain-switched fiber optical amplifiers for controlling the routine of the incoming optical signal from the system input to the system output;

outputs from the second plurality of gain-switched fiber optical amplifiers being supplied to the system output through an output optical coupler;

the first plurality of gain-switched fiber optical amplifiers, the input optical coupler, and the pump arrangement together forming a gain-switched optical distributor for performing a head-end switching function for 1×N protection switching; and the second plurality of gain-switched fiber optical amplifiers, the output optical coupler, and the pump arrangement together forming a gain-switched optical selector for performing a tail-end switching function for 1×N protection switching, wherein each of the plurality of gain-switched fiber optical amplifiers comprises an optical rare earth-doped fiber having a predetermined length and a corresponding filter, the pump arrangement including a tunable pump and a pump tuning circuit and a coupler for coupling an output from the tunable pump to each of the filters corresponding to the plurality of gain-switched fiber optical amplifiers, the pump tuning circuit being responsive to command and control signals for controlling the tunable pump to supply pumping signals for turning ON/OFF one or more of the plurality of gain-switched fiber optical amplifiers, the filters filtering the pump signal to effect the turning ON/OFF of the one or more of the plurality of gain-switched fiber optical amplifiers.

14. The optical protection switching system of claim 13 wherein the fiber is doped with erbium.

15. The optical protection switching system of claim 13 wherein the pump arrangement associated with the rare earth-doped fiber is arranged to provide co-directional pumping of the rare earth-doped fiber optical amplifier.

16. The optical protection switching system of claim 13 wherein the pump arrangement associated with the rare earth-doped fiber is arranged to provide counter directional pumping of the rare earth-doped fiber optical amplifier.

17. The optical protection switching system of claim 8 wherein the optical communications arrangement comprises a lossy optical line.

18. The optical protection switching system of claim 8 wherein the optical communications arrangement comprises optical communications equipment.

19. The optical protection switching system of claim 1 wherein the pump arrangement controls ON/OFF states of each of the plurality of gain-switched fiber optical amplifiers to establish at least one active optical communication path and at least one standby optical communication path between the input and the output of the optical protection switching system.

20. The optical protection switching system of claim 8 wherein the pump arrangement controls ON/OFF states of each of the plurality of gain-switched fiber optical amplifiers to establish at least one active optical communication path and at least one standby optical communication path between the input and the output of the optical protection switching system.

21. The optical protection switching system of claim 13 wherein the pump arrangement controls ON/OFF states of each of the plurality of gain-switched fiber optical amplifiers to establish at least one active optical communication path and at least one standby optical communication path between the input and the output of the optical protection switching system.

* * * * *